US008971357B2

(12) United States Patent
Bui et al.

(10) Patent No.: US 8,971,357 B2
(45) Date of Patent: Mar. 3, 2015

(54) METHOD FOR SYNCHRONIZING MASTER AND SLAVE CLOCKS OF A PACKET-SWITCHED NETWORK WITH AGGREGATED CONNECTIONS BETWEEN NODES, AND ASSOCIATED SYNCHRONIZATION DEVICES

(75) Inventors: Dinh Thai Bui, Nozay (FR); Michel Le Pallec, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 71 days.

(21) Appl. No.: 13/825,604

(22) PCT Filed: Oct. 27, 2011

(86) PCT No.: PCT/EP2011/068904
§ 371 (c)(1),
(2), (4) Date: Mar. 25, 2013

(87) PCT Pub. No.: WO2012/065823
PCT Pub. Date: May 24, 2012

(65) Prior Publication Data
US 2013/0223458 A1    Aug. 29, 2013

(30) Foreign Application Priority Data
Nov. 15, 2010  (FR) ...................................... 10 59341

(51) Int. Cl.
*H04J 3/06* (2006.01)
(52) U.S. Cl.
CPC ............. *H04J 3/0658* (2013.01); *H04J 3/0667* (2013.01)
USPC .......................................... 370/503; 370/350

(58) Field of Classification Search
USPC ............................................ 370/503, 509, 350
See application file for complete search history.

(56) References Cited

U.S. PATENT DOCUMENTS

| | | | |
|---|---|---|---|
| 8,064,485 B1* | 11/2011 | Montini et al. | 370/503 |
| 2002/0163932 A1* | 11/2002 | Fischer et al. | 370/465 |
| 2006/0056460 A1 | 3/2006 | Currivan | |
| 2009/0147806 A1* | 6/2009 | Brueckheimer | 370/503 |
| 2010/0158183 A1* | 6/2010 | Hadzic et al. | 375/376 |
| 2011/0006818 A1* | 1/2011 | Takagi et al. | 327/147 |
| 2011/0035511 A1* | 2/2011 | Biederman | 709/248 |
| 2011/0051754 A1* | 3/2011 | Lansdowne | 370/503 |
| 2011/0216660 A1* | 9/2011 | Lee et al. | 370/252 |
| 2011/0262133 A1* | 10/2011 | Yuan | 398/43 |
| 2012/0069944 A1* | 3/2012 | Hadzic et al. | 375/376 |

* cited by examiner

*Primary Examiner* — Brian D Nguyen
(74) *Attorney, Agent, or Firm* — Carmen Patti Law Group, LLC

(57) ABSTRACT

An exemplary technique is provided for synchronizing master and slave clocks of a packet-switched network. The network contains at least two equipments that are connected to one another via an aggregated connection made up of at least two links and that are located between the master and slave clocks to enable them to transmit synchronization packets to one another using a timestamp protocol. The technique includes (a) obtaining a distribution of the synchronization packets in at least one subset of the links that transport these synchronization packets, and (b) transmitting to the slave clock first information representative of that distribution, second information representative of timestamps associated with the synchronization packets, and third information representative of packet transmission times over the at least one subset of links, to synchronize the slave clock to the master clock as a function of at least the first, second, and third information transmitted.

14 Claims, 1 Drawing Sheet

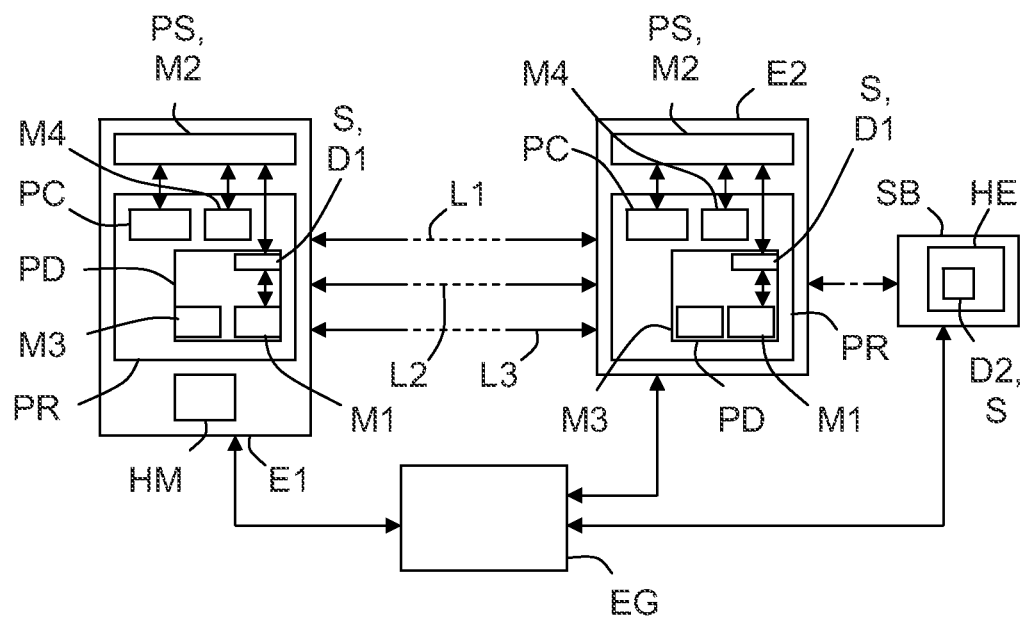

METHOD FOR SYNCHRONIZING MASTER AND SLAVE CLOCKS OF A PACKET-SWITCHED NETWORK WITH AGGREGATED CONNECTIONS BETWEEN NODES, AND ASSOCIATED SYNCHRONIZATION DEVICES

TECHNICAL FIELD

The invention pertains to packet-switched networks which comprise equipment (or nodes) linked to one another via an aggregated connections, comprising at least two links (or physical communication channels), and located between master and slave clocks that are to be synchronized.

Here, the term "packet-switched network" refers to a communication network in which digital messages are transmitted in the form of data packets from a source address to a recipient address by communication or routing operations. It should be noted that the communication medium may be wired or wireless.

Furthermore, the term "equipment (or node)" refers here to any network equipment (or element) representing a communication point or routing point. It may therefore, for example, be a switch or a router.

Additionally, the term "master clock" refers here to an element capable of transmitting, receiving, and processing synchronization messages/packet timestamped using a timestamp protocol, such as the protocol IEEE 1588V2 or the IETF protocol NTP ("Network Time Protocol"). This element maintains the reference frequency or time that must be distributed to one or more slave clocks. Such an element may be, for example, an IEEE 1588V2 master clock. A master clock may be integrated into, or co-located with, a network element or equipment (such as a switch or router), but this is not mandatory.

Finally, the term "slave clock" refers here to an element capable of transmitting, receiving, and processing timestamped messages/packets, in order to set a local time to the reference frequency or time that is distributed from the master clock by means of the timestamp protocol. This local clock is particularly intended to provide a reference frequency or time to the applications connected to the slave clock. Such an element may be, for example, integrated within, or co-located with, a base station (in a non-wired network), but this is not mandatory.

STATE OF THE ART

Whenever it is desired to synchronize a slave clock based on a master clock, a reference time or frequency must be distributed from the master clock to the slave clock by means of the nodes of a packet-switched network and by means of synchronization messages/packets.

By way of a nonlimiting example, the synchronization messages may be messages of the IEEE 1588V2 protocol (or PTPV2 for "Precision Time Protocol release 2") in at least one direction of communication, for example, from the master clock to the slave clock, ("SYNC" messages, for example) or from the slave clock to the master clock ("DELAY_REQ" messages, for example). These synchronization messages contain timestamp information, which enable the slave clock's time to be synchronized from the master clock, based on which a frequency synchronization (or tuning) may be derived. As a reminder, the frequency may be derived from the time, but the reverse cannot.

SUMMARY OF THE INVENTION

As a person skilled in the art knows, to synchronize a slave clock to a master clock, at least the outbound (or respectively, inbound) transmission time of the synchronization messages' packets (hereafter known as the synchronization packets) between the master and slave clocks must be known.

Some timestamped protocols, such as 1588V2, make it possible to determine this transmission time with a certain degree of accuracy, thanks to timestamps which are made by transparent clocks in the nodes traversed.

As a reminder, a transparent clock is tasked with determining the local transit time (in the associated node) of the synchronization packets of a flow (by finding the difference between the local departure time stamp and the local arrival timestamp) and adding this determined local transit time to the current value of a so-called correction field which is located within the header of the synchronization packet in question (or within that of the associated "follow-up" message).

In order to very accurately temporally synchronize (for example, with an accuracy of 1 µs) a slave clock to a master clock, it is necessary to very accurately tell the outbound or inbound transmission time (single-direction time) of the synchronization packets between the master clock and the slave clock. However, known timestamp protocols only make it possible to accurately measure the outbound-inbound (round-trip) transmission time of the synchronization packets over a link, and not the single-direction outbound-inbound transmission times on this link. One is therefore forced to assume, as an approximation, that the outbound (or inbound) transmission time over a length is equal to half of the round-trip transmission time over that link.

As long as the difference between the outbound transmission time and the inbound transmission time over a link, known as the link's time asymmetry, is negligible given the desired accuracy of the time synchronization, the aforementioned approximation is usable. This is particularly true, whenever an accuracy greater than about 10 µs is required. This is no longer true whenever this asymmetry can no longer be considered negligible in comparison to the time synchronization accuracy that is required. This is particularly true whenever an accuracy on the order of a microsecond or less is required (for example, a MIMO network may require a time synchronization accuracy of about 200 ns). It is therefore necessary to measure the single-direction times (for example, by means of manual measurements) and to enter these measurements into the synchronization clocks.

Furthermore, whenever network equipment (or nodes) are connected to one another via an aggregated connection, itself made up of multiple links, the synchronization packets may take at least one of these links. Consequently, the master and slave clocks cannot tell on which link each synchronization packet travels in order to apply the correct single-direction times entered in this way. This would not be a bother if the respective (single-direction) outbound (or inbound) transmission times over the different lengths were roughly identical compared to the required accuracy. However, this is generally not true when an accuracy less than or equal to a microsecond is sought.

As a reminder, aggregated connections are very frequently used in networks for redundancy purposes or to achieve a greater throughput with economical low-speed links. These aggregated connections may also each be constituted by an optical fiber within which multiple optical wavelengths are used, or each by a wireless connection in which multiple different transmission channels are used.

In order to remedy the aforementioned drawback in an environment with aggregated connections, it has been proposed to implement a synchronization architecture that avoids these connections. In some cases, this assumes the implementation of an architecture dedicated to the transportation of synchronization packets. Consequently, the solution may prove very expensive, and most of all cause the loss of redundancy offered by the aggregated connections. This solution therefore reduces the advantage initially offered by the 1588V2 protocol, to with the possibility of deploying a synchronization solution by way of a shared network infrastructure.

It is therefore a purpose of the invention to enable more accurate synchronization of master and slave clocks in packet-switched environments with aggregated connections (each made up of at least two individual links) between nodes (or equipment).

According to a first aspect, the invention proposes a method dedicated to the synchronization of master and slave clocks of a packet-switched network comprising at least two equipment (or nodes), connected to one another via an aggregated connection, made up of at least two links, and located between the master and slave clocks in order to allow them to transmit synchronization packets with one another using a timestamp protocol.

This method more specifically comprises the following steps:
(a) obtaining (or potentially recording) a distribution of the synchronization packets in at least one subset of the links that transport these synchronization packets, and
(b) transmitting to the slave clock first information representative of that distribution, second information representative of timestamps associated with the synchronization packets, third information representative of packet transmission times over the links, in order to synchronize the slave clock from the master clock based on at least the transmitted first, second, and third information.

The method may comprise other characteristics that may be taken separately or in combination, and in particular:
in a first embodiment, step (a) may be carried out within a first equipment that is to transmit the packets to a second equipment;
a determination of the distribution of the synchronization packets that are to travel on each of the links may be carried out, if there is an equal distribution of packets among these links;
one may obtain (or determined) in step (a), for M successive synchronization packets to be transmitted during a predefined observation time (or "window"), their distribution among each of the links, and then may generate the first information as a function of these determined distributions;
a relative distribution of segregation packets may be determined within each link by dividing the distribution of these synchronization packets obtained over that link by the value M, M being the total number of synchronization packets transmitted during the predefined observation time (or window);
during step (b), within the slave clock, an offset dt between the slave and master clocks by means of the formula:

$$dt = \left[\frac{1}{M}\sum_{m=1}^{M}(T2_m - T1_m)\right] - \left[\frac{1}{K}\sum_{k=1}^{K}w_k d_k\right],$$

where m represents one of the M successive synchronization packets, k represents one of the K links constituting the aggregated connection, $T2_m$ is the value of a timestamp associated with the mth synchronization packet from among the M within the second equipment, $T1_m$ is the value of a timestamp associated with the mth synchronization packet from among the M within the first equipment $w_k$ is a weight associated with one of the links and representative of the relative distribution of synchronization packets within that link, and $d_k$ is the packet transmission time between the equipment on the kth link;
in one variant, during the step (b), in the slave clock, a time offset dt between the slave and master clocks may be determined by means of the formula:

$$dt = \left[\frac{1}{M}\sum_{m=1}^{M}\frac{(T2_m - T4_m) - (T1_m - T3_m)}{2}\right] - \left[\frac{1}{K}\sum_{k=1}^{K}\frac{w_k da_k}{2}\right],$$

where m represents one of the M successive synchronization packets, k represents one of the K links of the aggregated connection, $T1_m$ is the value of a timestamp associated with an mth synchronization packet from among the M in the first equipment during the transmission going from the master clock to the slave clock, $T2_m$ is the value of a timestamp associated with the mth synchronization packet from among the M within the second equipment during the transmission from the master clock to the slave clock, $T3_m$ is the value of a timestamp associated with a packet within the second equipment during a transmission from the slave clock the master clock, $T4_m$ is the value of a timestamp associated with that last packet within the first equipment during the transmission from the slave clock to the master clock, $w_k$ is a weight associated with one of the links and representative of the relative distribution of synchronization packets over that link, and $da_k$ is the round-trip packet transmission time on the kth link;

In a first variant, a (first) equipment may be required to carry out an equal distribution of synchronization packets to be transmitted within at least one subset of links, each synchronization packet being placed within a buffer memory while waiting to be transmitted over a link of the subset and being associated with a timestamp at the time when it is extracted from the buffer memory in order to be transmitted over a link, and during the step (b) first information representative of that equal distribution may be generated;
it may be determined during step (b), within the slave clock, a synchronization packet transmission time between the equipment which is equal to the sum of the packet transmission time over the links, defined by the third received information, divided by the number of links;

in a second variant, a (first) equipment may be required to distribute all of the synchronization packets to be transmitted within a chosen link, each synchronization packet then being placed within a buffer memory while waiting to be transmitted and being associated with a timestamp at the time when it is extracted from the buffer memory in order to be transmitted over the chosen link, and first information may be generated and transmitted in step (b) that is representative of the chosen link (the object of the distribution), and then, within the slave clock, a synchronization packet transmission time between the equipment may be determined that is equal to the packet transmission time on the chosen length;

in a second embodiment, the step (a) may be carried out within a second equipment that has received it packets from a first equipment.

According to a second aspect, the invention proposes a device dedicated to the synchronization of master and slave clocks of a packet-switched network comprising at least two equipment (or nodes) that are connected to one another via an aggregated connection made up of at least two links, and that are located between the master and slave clocks in order to allow them to transmit synchronization packets with one another using a timestamp protocol. This first device is, firstly, capable of serving as an interface between a first module of an equipment, capable of routing packets to be transmitted to the links, and a second module of that same equipment, managing the timestamp protocol, and secondly, operative to obtain (or potentially record) the distribution of synchronization packets over the links of the aggregated connection and control the transmission to the slave clock of first information that is representative of the distribution obtained in view of synchronizing it to the master clock.

This first device may also be operative to control the distribution of synchronization packets within at least one chosen subset of links of the aggregated connection.

According to a third aspect, the invention proposes a second device, dedicated to the synchronization of a slave clock of a packet-switched network to a master clock of that same packet-switched network, said network comprising at least two equipments connected to one another via an aggregated connection, made up of at least two links, which are located between the master and slave clocks in order to allow them to transmit synchronization packets to one another according to a timestamp protocol. This second device is operative to extract from the synchronization packets that were received by the slave clock at least second information that is representative of timestamps that were associated with it, and to synchronize the slave clock to the master clock as a function of at least this extracted second information, received first information representative of a distribution of synchronization packets transmitted by at least one of the links, and received third information, representative of packet transmission times over the links.

According to a fourth aspect, the invention proposes a system for synchronizing master and slave clocks of a packet-switched network comprising at least two equipment (or nodes) that are connected to one another via an aggregated connection made up of at least two links, and that are located between the master and slave clocks in order to allow them to transmit synchronization packets with one another using a timestamp protocol. This system comprises at least one first device of the type presented above, capable of being associated with one of the equipments, and at least one second device of the type presented above, capable of being associated with the slave clock.

BRIEF DESCRIPTION OF THE DRAWINGS

Other characteristics and advantages of the invention will become apparent upon examining the detailed description below, and the attached drawing in which:

FIG. 1 schematically and functionally depicts nodes and master and slave clocks of a packet-switched network, connected to one another via an aggregated connection comprising three links and within which are installed synchronization devices constituting an example embodiment of a synchronization system according to the invention.

DETAILED DESCRIPTION

It is an object of the invention to enable the accurate synchronization of a slave clock HE of the packet-switched network with aggregated connections to a master clock HM of that same packet-switched network.

In what follows, it is assumed, by way of an illustrative example, that the slave clock HE is integrated into a base station SB of a LTE ("Long Term Evolution") network. Furthermore, it is assumed in what follows, by way of an illustrative example, that the master clock HM is integrated into a router E1 that constitutes one of the equipments (or nodes) of the LTE network or an LTE mobile backhaul network. However, the invention is not limited to this type of scenario.

It should be noted that the invention relates to any type of packet-switched network, whether wired or wireless, and comprises equipments (or nodes) Ei which are located between master HM and slave clocks HE that are to be synchronized with one another, which are connected to one another via an aggregated connection made up of at least two links Lk, and within which the incoming and outgoing packets may be assigned timestamps intended to report their departure and arrival times with respect to a local clock.

In the nonlimiting example illustrated in the sole FIGURE, the base station SB is connected to a (second) equipment (or node) E2 of the network (such as a router or switch, which is connected to the (first) equipment E1 via an aggregated connection made up of three links Lk (k=1 to 3). These links Lk are intended to enable the transmission of packets between the equipments Ei (i=1 or 2), and particularly synchronization packets defining synchronization messages intended for the master clock HM or the slave clock HE. It should be noted that the equipment Ei may be connected by two links Lk or by more than three links Lk, for example four or five, or even more.

In what follows, it is assumed by way of an illustrative example that the synchronization messages are transmitted based on the timestamp protocol IEEE 1588V2 (or PTPV2). Consequently, the synchronization messages that are transmitted from the master clock HM to the slave clock HE may be of the type "SYNC", and the synchronization messages that are transmitted from the slave clock HE to the master clock HM may be of the type "DELAY_REQ". However, the invention is not limited to this type of timestamp protocol, nor to these types of messages. Thus, it also relates, for example, to the IETF protocol NTP (Network Time Protocol).

In order to allow the transmissions of the aforementioned packets, each equipment Ei comprises a protocol stack separated into planes, and particularly a network plane PR and a synchronization plane PS.

The network plane PR conventionally comprises a control plane PC, an operations, administration, and maintenance (or "OAM") module M4, and a data plane PD. The data plane PD conventionally comprises a first module for managing connections over multiple links M1, tasked with routing packets to be transmitted to at least one of the links Lk, and the third module for managing connections over multiple links M3, tasked with routing packets to be transmitted to a single link Lk.

The synchronization plane PS comprises a second module M2 tasked with managing the timestamp protocol (here 1588V2).

According to one aspect, the invention proposes implementing a method of synchronizing master clocks HM and slave clocks HE of a network of the type described above.

This method comprises two main steps (a) and (b).

A first main step (a) of the method consists of obtaining (or potentially recording) the distribution of synchronization packets within at least one subset of the links Lk of an aggregated connection that transport these synchronization packets.

It should be understood that packets of all types are distributed in the equipment Ei that is connected to the clock (master HM or slave HE) that intends to transmit synchronization packets to the other clock (slave HE or master HM). For example, whenever the master clock HM wishes to transmit synchronization packets (here belonging to SYNC messages), the first equipment E1 is the one that carries out the distribution of these synchronization packets. Whenever the slave clock HE wishes to transmit synchronization packets (here belonging to DELAY_REQ messages), the second equipment E2 is the one that carries out the distribution of these synchronization packets.

It is important to note that multiple types of distribution may be foreseen.

Thus, an equipment Ei may carry out an equal (conventional) distribution of packets to be transmitted (data packets, synchronization packets, and control packets) within the various links Lk. This equal distribution of packets may, for example, be a round-robin distribution.

In a first variant, a first (synchronization) device D1 may require an associated equipment Ei to carry out an equal distribution of only those synchronization packets to be transmitted within at least one subset of links Lk. In this situation, the slave clock HE may assume that the synchronization packets' transmission time between the first E1 and second E2 equipment is equal to the sum of the (single-direction) transmission times of the packets over the links Lk divided by the number K of links Lk (here K=3). It should be noted that it is advantageous here to provide within the equipment Ei a buffer memory within which the synchronization packets are temporarily placed while waiting to be transmitted over a link Lk of the subset. This buffer memory may introduce an additional jitter packet whose effect may be cancelled out by timestamping every synchronization packet for the equipment Ei in question at the output of the buffer memory.

In the second variant, a first (synchronization) device D1 may require an associated equipment Ei to carry out a distribution of all the synchronization packets to be transmitted within a single chosen link Lk (for example, the second one L2). It should be understood that in this situation, the chosen link (here L2) transmits packets of all types, not just the synchronization packets. It should be noted that it is advantageous to provide within the equipment Ei a buffer memory within which the synchronization packets are temporarily placed while waiting to be transmitted over the chosen link L2. This buffer memory may introduce an additional jitter packet whose effect may be cancelled out by timestamping every synchronization packet for the equipment Ei in question at the output of the buffer memory.

In all the situations described above, achieving (potentially recording) the distribution of the synchronization packets within the set of links Lk is ensured by a first (synchronization device) D1 that ensures that the interfacing between the first M1 and second M2 modules of an equipment Ei. This first device D1 may, as illustrated, form part of the network plane PR, and preferentially, its data plane PD. However, it may be external to the data plane PD or network plane PR while being coupled to the first module M1 and the second module M2. In all situations, the first device D1 may be constructed in the form of software (or computing) modules, or electronic circuits, or a combination of electronic circuits and software modules.

It should be noted that in the second variant, the first device D1 requires the 1588V2 protocol to view the multiple links Lk as a single link, and therefore to assume that the outbound or round-trip transmission time is that of the single link chosen (here L2).

It should also be noted that in order to determine the distribution of the synchronization packets, they must be distinguished from packets of different types that must be transmitted over the same links Lk, within the equipment Ei tasked with transmitting them. In order to do so, one may, for example, determine within the equipment Ei in question, from among all the packets to be transmitted, those which possess a field value designating a synchronization packet, for purely local usage (and which therefore will not be integrated into the transmitted packet). For example, this field may be a synchronization bit that takes either a value equal to zero (0) whenever the associated packet is not a synchronization packet, or a value equal to one (1) whenever the associated packet is a synchronization packet. Finally, it is possible to achieve (or record) the distribution of synchronization packets distinguished in this way within each of the links Lk (as the synchronization packets are only distributed within the single chosen link L2 in the second variant).

It is important to note that the first device D1 may act within each equipment Ei either when transmitting synchronization packets between the links Lk, or when receiving the synchronization packets coming from the links Lk (and therefore transmitted by the other equipment Ei' where i'≠i).

Whenever it acts when receiving, for example within the second equipment E2, it may, for example, distinguish the synchronization packets from the packets of different types through a particular value chosen from a field that all the synchronization packets have in common, such as the quality of service (or QoS) field.

It should be noted that the first device D1 may potentially control the distribution of the synchronization packets in certain cases (described later on).

The second step (b) of the method consists of transmitting to the slave clock HE, firstly, first information that is representative of the distribution of packets that was obtained (or recorded) over at least one subset of the different links Lk, secondly, second information that is representative of timestamps associated with the synchronization packets and thirdly, third information that is representative of outbound $d_k$ or round-trip packet transmission times $da_k$ over at least the subset of links Lk taken by the synchronization packets. This information (at least) is used locally within the slave clock HE in order to synchronize to the master clock HM.

It is important to note that the first, second, and third information is not necessarily transmitted simultaneously and/or transmitted in the same way. This depends, in particular, on the distribution mode of the synchronization packets and the frequency of measuring outbound $d_k$ or round-trip packet transmission $da_k$ times.

Thus, the third information may be measured in advance and considered to be roughly constant for a certain duration, or even automatically. Consequently, this third information may potentially be transmitted ahead of time. It should be noted that the third information may be transmitted by a management equipment EG that is connected to the equipment Ei, master clock HM and slave clock HE, or by the synchronization packets in a dedicated field of the 1588V2 protocol (through the involvement of the first device D1).

The second information result from the timestamping of the synchronization packets when they arrive in and/or leave an equipment Ei, in accordance with the operating rules of the 1588V2 protocol. Consequently, they automatically form part of the synchronization packets which are transmitted. It should be noted that timestamping at the input and output may be used by a transparent clock element, combined with an equipment Ei, in order to determine the transit time of a synchronization packet within that equipment Ei. All it needs to do is find the difference between the departure timestamp of the synchronization packet with respect to a local clock (defined by an output timestamp) and the arrival timestamp of that same synchronization packet with respect to that same local clock (defined by an arrival timestamp).

These two pieces of information representative of a local transit time may, for example, be totaled in a so-called correction field located within the header of the synchronization packet in question. For example, the first device D1 may be operative to communicate to the transparent clock associated with its equipment Ei, for each synchronization packet, the transmission time counted on the link in question and/or the total transit time on the link in question, in order for that transparent clock to add to those times the local transit time that it has determined, in order for that synchronization packet to be transmitted to the next node.

Whenever an equal distribution of only the synchronization packets is performed (first variant), it is sufficient to inform the slave clock HE of this in advance, so that it can use for its synchronization an outbound packet transmission time (or round-trip da) equal to the sum of the outbound packet transmission times $d_k$ (or round-trip packet transmission times $da_k$) over the various links Lk divided by the number K of links Lk (here K=3). In this case, the first (distribution) information is intended to report this distribution. It should be noted that in this situation, the first (distribution) information may be transmitted by the aforementioned management equipment EG, or by the synchronization packets within a dedicated field of the 1588V2 protocol (through the involvement of the first device D1).

Whenever a distribution of all the synchronization packets to be transmitted within a single chosen link Lk is performed (second variant), it is sufficient to inform the slave clock HE of this in advance, so that it can use for its synchronization an outbound packet transmission time d (or round-trip da) equal to the outbound packet transmission time $d_k$ (or round-trip $da_k$) over the chosen link Lk. The first (distribution) information is intended to report the mode of distribution and/or the sole link chosen Lk. It should be noted that in this situation, the first (distribution) information may be transmitted by the aforementioned management equipment EG, or by the synchronization packets within a dedicated field of the 1588V2 protocol (through the involvement of the first device D1).

Whenever an equal distribution of packets of all types is carried out within the various links Lk, it is necessary to determine for each link Lk the number of synchronization packets that will take it (transmission action by D1) or that took it (reception action by D1), in order to inform the slave clock HE of this in the form of first information.

To do so, the first device D1 may (during transmission or reception) use synchronization packet counters for each of the links Lk. Preferentially, the number of successive synchronization packets that are counted is limited to a reduced value M (this amounts to periodically performing a count during a time window of a chosen duration, potentially a sliding window). The relative distribution of synchronization packets within the link Lk is in this case equal to the number of synchronization packets routed to that link Lk divided by M. For example, a value of M is chosen equal to 100 or 200. It should be understood that the greater M is, the stronger the tendency towards an equal distribution of synchronization packets among the various links Lk, which does not require the use of counters. In this case, the first (distribution) information is intended to report each relative distribution within each link Lk. It should be noted that in this situation, the first (distribution) information may be transmitted by the equipment Ei in question to the slave clock HE either directly or indirectly via the aforementioned management equipment EG, or by the synchronization packets in a dedicated field of the 1588V2 protocol (through the involvement of the first device D1).

Once the slave clock HE knows first, second, and third information (related to the current situation—for example, valid immediately after the receipt of M successive synchronization packets that have been counted), it is possible to synchronize the slave clock HE to the master clock HM.

In particular, the second (timestamp) information carried by the synchronization packets may feed phase locked loops (PLLs) that make it possible to converge towards the frequency of the master clock HM, and therefore to very accurately deduce the current time of the master clock HM based on the propagation times $d_k$ (or $da_k$) over the link(s) Lk (third information) and first distribution information.

By way of example, once you have equally distributed packets of all types among the various links Lk, it is possible to determine, during the step (b), the time offset dt that exists between the slave clock HE and the master clock HM by means of a predefined formula.

For example, whenever outbound packet transmission time over the links Lk are known, the following formula can be used:

$$dt = \left[\frac{1}{M}\sum_{m=1}^{M}(T2_m - T1_m)\right] - \left[\frac{1}{K}\sum_{k=1}^{K}w_k d_k\right],$$

where m represents one of the M successive synchronization packets, k represents one of the K links Lk, $T2_m$ is the value of a timestamp T2 (if 1588V2 is being used) that was associated (during reception) with an mth synchronization packet from among the M within the second equipment E2 during a transmission from the master clock HM to the slave clock HE, $T1_m$ is the value of a timestamp T1 (if 1588V2 is being used) that was associated (during transmission) with the mth synchronization packet from among the M within the first equipment E1 during a transmission from the master clock HM to the slave clock HE, $w_k$ is a weight associated with one of the links Lk and representative of the relative distribution of synchronization packets over the link Lk, and $d_k$ is the outbound packet transmission time between the first E1 and second E2 equipment over the kth link Lk.

In one variant, whenever round-trip Lk packet transmission time over the links Lk are known, the following formula can be used:

$$dt = \left[\frac{1}{M}\sum_{m=1}^{M}\frac{(T2_m - T4_m) - (T1_m - T3_m)}{2}\right] - \left[\frac{1}{K}\sum_{k=1}^{K}\frac{w_k da_k}{2}\right],$$

where $T3_m$ is the value of a timestamp T3 (if 1588V2 is used) that was associated (during transmission) with a synchronization packet within the second equipment E2 during a transmission from the slave clock HE to the master clock HM, $T4_m$ is the value of a timestamp T4 (if 1588V2 is being used) that was associated (during reception) with that same synchronization packet within the first equipment E1 during a transmission from the slave clock HE to the master clock HM, and $da_k$ is the round-trip packet transmission time over the kth link Lk.

It should be noted that the relative distributions $w_k$ are only valid timewise during the transmission of the corresponding M successive synchronization packets. For example, it is possible to foresee using multiple sets of counters associated with sliding time windows, in order for the slave clock HE to always know valid relative distributions $w_k$.

It should also be noted, as depicted, that the slave clock HE may be associated with a second synchronization device D2 that is tasked with extracting from the synchronization packets received by the slave clock HE at least second timestamp information and/or transit time information, and potentially first distribution information. This second device D2 is also tasked with the aforementioned synchronization based on the available first, second, and third information.

Here, the word "associated" refers both to forming an integral part of a slave clock HE (as depicted), and being coupled directly or indirectly to a slave clock HE. Consequently, a second (synchronization) device D2 may be constructed in the form of software (or computer) modules, or electronic circuits, or a combination of electronic circuits and software modules.

It should also be noted that the first D1 and second D2 synchronization devices may together constitute a synchronization system S intended to be distributed "at least" within equipment Ei and within the slave clock HE.

The invention is not limited to the embodiments of the synchronization method, first and second synchronization devices, and synchronization system described above, which are given only as examples, but rather encompasses all variants that the person skilled in the art may envision within the framework of the claims below.

The invention claimed is:

1. A method for synchronizing master clocks and slave clocks of a packet-switched network comprising at least two equipments which are connected to one another via an aggregated connection made up of at least two links and located between said master clocks and said slave clocks to enable them to transmit synchronization packets with one another using a timestamp protocol, said method comprising the steps of:
   (a) achieving a distribution of said synchronization packets within at least one subset of links that transport these synchronization packets, and
   (b) transmitting, from one of said at least two equipments to said slave clock in another of said at least two equipments, first information representative of said distribution, second information representative of timestamps associated with said synchronization packets, and third information representative of packet transmission times over said at least one subset of links, to synchronize said slave clock to said master clock as a function of at least said first information, said second information, and said third information transmitted.

2. The method according to claim 1, wherein said step (a) is carried out within a first equipment that is to transmit said packets to a second equipment.

3. The method according to claim 2, wherein a determination is carried out of the distribution of said synchronization packets that are to take each of said links, in the event of an equal distribution of said packets within said links.

4. The method according to claim 3, wherein during step (a), for M successive synchronization packets to be transmitted during a predefined observation time, their relative distribution within each link is determined, and then said first information is generated based on these determined distributions.

5. The method according to claim 4, wherein during step (b), in said slave clock, a time offset between said slave clock and said master clock is determined using the formula:

$$dt = \left[\frac{1}{M}\sum_{m=1}^{M}(T2_m - T1_m)\right] - \left[\frac{1}{K}\sum_{k=1}^{K}w_k d_k\right],$$

where m represents one of the M successive synchronization packets, k represents one of said links, $T2_m$ is the value of a timestamp associated with a mth synchronization packet among the M within said second equipment, $T1_m$ is the value of a timestamp associated with said mth synchronization packet from among the M within said first equipment, $w_k$ is a weight associated with one of said links and representative of the relative distribution of synchronization packets within that link, and $d_k$ is a packet transmission time between said equipments over the kth link.

6. The method according to claim 4, wherein during step (b), in said slave clock, a time offset between said slave clock and said master clock is determined using the formula:

$$dt = \left[\frac{1}{M}\sum_{m=1}^{M}\frac{(T2_m - T4_m)-(T1_m - T3_m)}{2}\right] - \left[\frac{1}{K}\sum_{k=1}^{K}\frac{w_k da_k}{2}\right],$$

where m represents one of the M successive synchronization packets, k represents one of said links, $T1_m$ is the value of a timestamp associated with a mth synchronization packet among the M within said first equipment during a transmission from said master clock to said slave clock, $T2_m$ is the value of a timestamp associated with said mth synchronization packet from among the M within said second equipment during the transmission from said master clock to said slave clock, $T3_m$ is the value of a timestamp associated with a packet within said second equipment during a transmission from said slave clock to said master clock, $T4_m$ is the value of a timestamp associated with that last packet within the first equipment during the transmission going from said slave clock to said master clock, $w_k$ is a weight associated with one of said links and representative of the relative distribution of synchronization packets within that link, and $da_k$ is a round-trip packet transmission time over the kth link.

7. The method according to claim 2, wherein an equipment is required to perform an equal distribution of said synchronization packets to be transmitted within at least one subset of said links, each synchronization packet being placed within a buffer memory while waiting to be transmitted over a link of said subset and being associated with a timestamp at the time when it is extracted from said buffer memory in order to be transmitted over a link, and during step (b) first information representative of that equal distribution is generated.

8. The method according to claim 7, wherein during step (b), in said slave clock, a synchronization packet transmission time between said equipments is determined that is equal to the sum of the packet transmission times over said links, defined by said third information received, divided by the number of said links.

9. The method according to claim 2, wherein an equipment is required to distribute all of said synchronization packets to be transmitted over a chosen link, each synchronization packet being placed within a buffer memory while waiting to be transmitted and being associated with a timestamp at the time when it is extracted from said buffer memory in order to be transmitted over said chosen link, and during step (b) first information representative of said chosen link that is the subject of said distribution, and within said slave clock, a synchronization packet transmission time between said equipments is determined that is equal to the packet transmission time over said chosen link.

10. The method according to claim 1, wherein said step (a) is carried out within a second equipment that received said packets from a first equipment.

11. A device for synchronizing a master clock and a slave clock of a packet-switched network comprising at least two equipments, connected to one another via an aggregated connection made up of at least two links, and located between said master clock and said slave clock to enable them to transmit synchronization packets to one another using a timestamp protocol, said device being i) configured to serve as an interface between a first module of an equipment, configured to route packets to be transmitted to said links and a second module of that same equipment, configured to manage said timestamp protocol, and ii) configured to obtain the distribution of said synchronization packets over said links and control the transmission to said slave clock of first information representative of said distribution achieved in view of its synchronization to said master clock.

12. The device according to claim 11, wherein the device is configured to control the distribution of said synchronization packets within at least one chosen subset of said links.

13. A system for synchronizing a master clock and a slave clock of a packet-switched network comprising at least two equipments that are connected to one another via an aggregated connection made up of at least two links and that are located between said master clock and said slave clock to enable them to transmit synchronization packets to one another using a timestamp protocol, said system comprising at least one first device according to claim 11, capable of being associated with one of said equipment, and at least one second device capable of being associated with said slave clock.

14. A device for synchronizing a slave clock of a packet-switched network to a master clock of said packet-switched network, said network comprising at least two equipments that are connected to one another via an aggregated connection made up of at least two links and that are located between said master clock and said slave clock to enable them to transmit synchronization packets to one another using a timestamp protocol, said device being configured to extract from the synchronization packets received by said slave clock at least second information representative of timestamps that are associated with them, and to synchronize said slave clock to said master clock as a function of at least said extracted second information, received first information representative of a distribution of said synchronization packets transmitted by at least one of said links, and received third information representative of packet transmission times over said links.

* * * * *